United States Patent
Smith et al.

(10) Patent No.: US 7,554,938 B1
(45) Date of Patent: Jun. 30, 2009

(54) SYSTEM AND METHOD FOR PROVIDING AN INSTANT MESSAGING FUNCTION USING A PERSONAL COMPUTER EQUIPPED WITH A WIRELESS DIGITAL PACKET-SWITCHED MODEM

(75) Inventors: Steven G. Smith, Roswell, GA (US); Mitchell E. Davis, Palmetto, GA (US); Roland T. Morton, Jr., Alpharetta, GA (US); Ralph J. Mills, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 932 days.

(21) Appl. No.: 09/966,700

(22) Filed: Sep. 28, 2001

(51) Int. Cl.
*H04W 4/00* (2009.01)
(52) U.S. Cl. .................. 370/328; 709/206; 370/338
(58) Field of Classification Search ............... None
See application file for complete search history.

(56) References Cited

U.S. PATENT DOCUMENTS

| | | | |
|---|---|---|---|
| 6,038,664 A * | 3/2000 | Schumacher et al. ...... 709/217 |
| 6,301,609 B1 * | 10/2001 | Aravamudan et al. ...... 709/207 |
| 6,674,767 B1 * | 1/2004 | Kadyk et al. ............... 370/466 |
| 6,699,125 B2 * | 3/2004 | Kirmse et al. .............. 709/203 |
| 6,839,554 B2 * | 1/2005 | McDowell et al. ....... 455/412.2 |
| 6,938,087 B1 * | 8/2005 | Abu-Samaha .............. 709/227 |
| 7,032,023 B1 * | 4/2006 | Barrett et al. .............. 709/225 |
| 7,058,036 B1 * | 6/2006 | Yu et al. ..................... 370/335 |
| 7,130,885 B2 * | 10/2006 | Chandra et al. ............ 709/206 |
| 7,200,634 B2 * | 4/2007 | Mendiola et al. .......... 709/204 |
| 7,260,536 B1 * | 8/2007 | Abu-Samaha ............ 704/270.1 |
| 7,277,912 B2 * | 10/2007 | Corboy et al. .............. 709/203 |
| 2001/0027474 A1 * | 10/2001 | Nachman et al. ........... 709/204 |
| 2001/0034224 A1 * | 10/2001 | McDowell et al. ......... 455/412 |
| 2002/0013902 A1 * | 1/2002 | Youstra .................... 713/170 |
| 2002/0023131 A1 * | 2/2002 | Wu et al. .................... 709/205 |
| 2002/0035605 A1 * | 3/2002 | McDowell et al. ......... 709/206 |
| 2002/0055975 A1 * | 5/2002 | Petrovykh ................... 709/205 |
| 2002/0077082 A1 * | 6/2002 | Cruickshank ............... 455/413 |
| 2002/0083136 A1 * | 6/2002 | Whitten, II ................. 709/205 |
| 2002/0085701 A1 * | 7/2002 | Parsons et al. ......... 379/201.02 |
| 2002/0086732 A1 * | 7/2002 | Kirmse et al. ................ 463/42 |
| 2002/0174010 A1 * | 11/2002 | Rice, III ..................... 705/14 |
| 2002/0177453 A1 * | 11/2002 | Chen et al. .................. 455/466 |
| 2002/0188620 A1 * | 12/2002 | Doss et al. ............... 707/104.1 |
| 2003/0014477 A1 * | 1/2003 | Oppenheimer et al. ..... 709/203 |
| 2003/0021290 A1 * | 1/2003 | Jones ......................... 370/466 |
| 2003/0023684 A1 * | 1/2003 | Brown et al. ................ 709/204 |
| 2003/0031150 A1 * | 2/2003 | Yukie ......................... 370/338 |
| 2003/0060228 A1 * | 3/2003 | Capers et al. ............... 455/552 |
| 2005/0102382 A1 * | 5/2005 | MacGregor et al. ........ 709/223 |

* cited by examiner

*Primary Examiner*—Phuc H Tran
(74) *Attorney, Agent, or Firm*—Withers & Keys, LLC

(57) ABSTRACT

A method and system provide a mobile workforce with instant messaging capability while maintaining contact with remote systems. The invention employs the use of a computer such as a laptop computer equipped with a wireless digital packet-switched modem.

18 Claims, 7 Drawing Sheets

SYSTEM AND METHOD FOR PROVIDING AN INSTANT MESSAGING FUNCTION USING A PERSONAL COMPUTER EQUIPPED WITH A WIRELESS DIGITAL PACKET-SWITCHED MODEM

FIELD OF THE INVENTION

This invention relates to the field of communications and in particular to the field of wireless communications, in which a personal computer equipped with a wireless digital packet-switched modem enables an instant messaging function while maintaining contact with remote systems.

BACKGROUND

Service personnel such as technicians typically install, maintain and service equipment at customer sites that may be dispersed over a large geographic area. While on the customer's premises, mobile personnel may need access to a variety of data and systems located elsewhere and may be able to use portable computers such as laptop computers, to remotely access the required databases and systems via wireless and landline networks. In addition to accessing remote databases and systems, mobile personnel need to be able to receive and respond to communications sent by supervisors, and/or others, such as dispatchers and other controllers. One device available to deliver this type of interactive messaging service is an interactive pager. However, use of an interactive pager requires the purchase of a paging device (typically in the range of $500.00) plus monthly usage fees (typically in the range of $50.00). Since mobile personnel for some companies, such as some telecommunications companies, may number in the tens of thousands, and typically are already equipped with costly laptop computers, it would be helpful if the interactive messaging function could be performed using the laptop computer, thus saving the cost of the additional paging device and associated monthly usage fee. However, because mobile personnel with such a laptop computer already maintain contact with remote systems, the instant messaging function referred to above, must run concurrently with the remote accessing function.

SUMMARY OF THE INVENTION

In view of the foregoing, there is a need for a system and method that overcomes the drawbacks of the prior art. The invention described herein provides an instant messaging system and method that operates while maintaining contact with remote systems. The invention employs the use of a computer such as a laptop computer equipped with a wireless digital packet-switched modem.

A technician or other mobile employee logs onto a remote system access application. The remote system access application only ties up the wireless digital packet-switched modem when a transmission is being sent or received. While logged onto the remote system access application, a technician can access an instant messaging application by clicking on a desktop icon. The technician or other mobile employee may be restricted to sending messages to certain designated persons and/or restricted from sending messages to other mobile or field personnel.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

The present invention enables an instant messaging function between two users, at least one of whom is equipped with a computer having a wireless digital packet-switched modem. The instant messaging function is provided while executing a remote system access application.

Although the present invention is described with reference to a closed loop proprietary network including local, long distance and cable networks, it should be appreciated that the network on which the invention is implemented may be any local or wide area network, such as the Internet, for example, without departing from the scope of the present invention.

I. System Configuration

Generally, the instant messaging system includes portable personal computers in communication with a closed loop proprietary wireless network, and protocol servers for receiving and forwarding messages to and from the portable personal computers. The protocol servers are in communication with an instant messaging server to which other (in-house) computers are communicatively coupled. In addition, the portable personal computers may also be in communication via the protocol servers to a network access server in communication with legacy systems and other remote systems.

Figure 1:
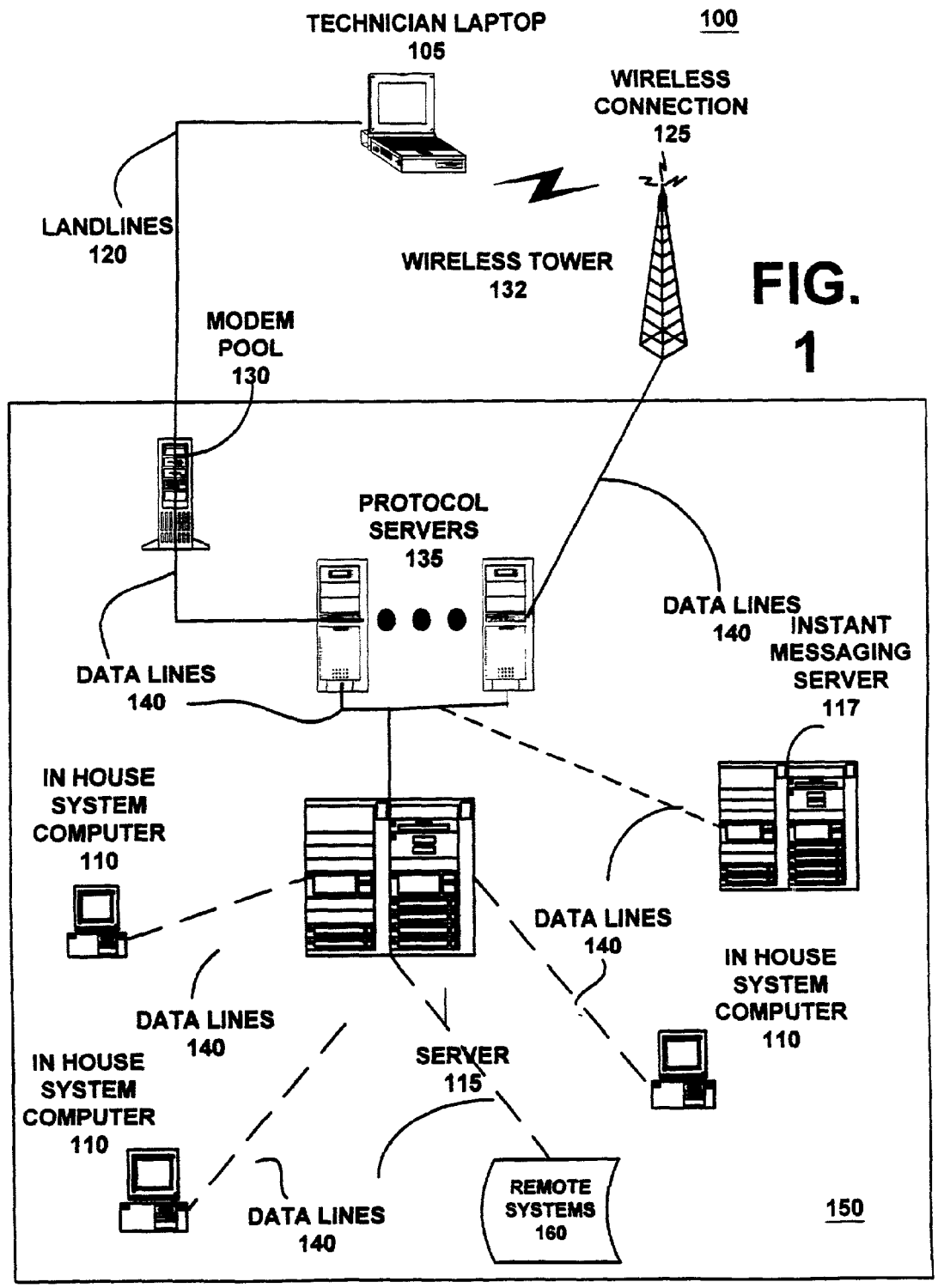
FIG. 1 is a block diagram of an exemplary network environment in which an embodiment of the present invention may be implemented.

FIG. 1 illustrates an exemplary network environment, in which an embodiment of the present invention may be implemented. Network system 100 enables an instant messaging function between computer 105 and computer 110 while computer 105 maintains contact with remote systems 160.

Figure 1A:
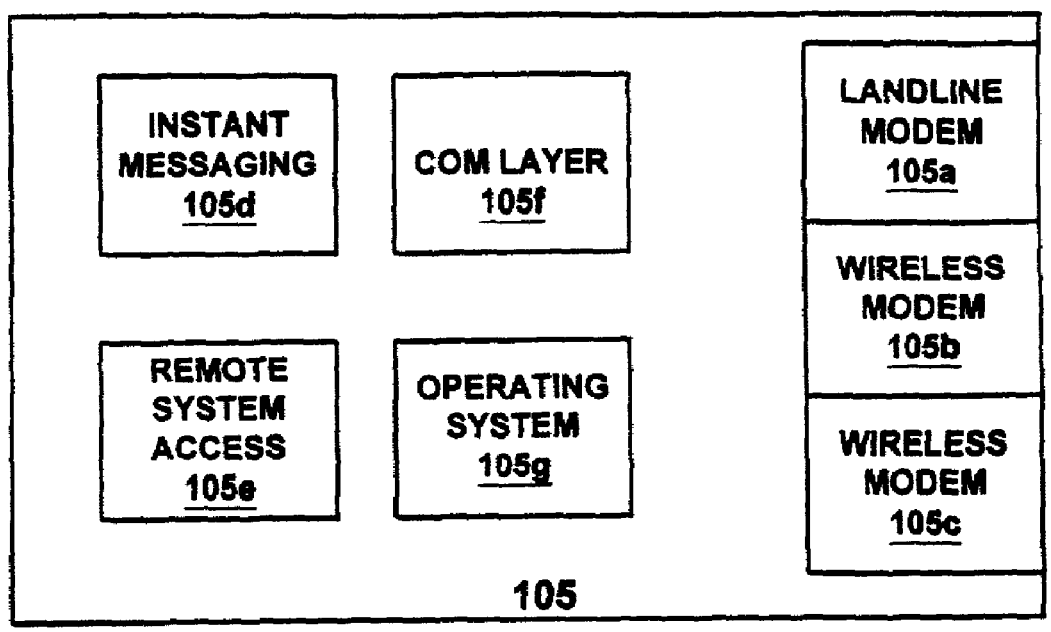
FIG. 1a is a more detailed block diagram of an exemplary computing device in the network environment of FIG. 1.

Computer 105 typically is a portable computer. In a preferred embodiment in accordance with the present invention, portable computer 105 may be an Itronix laptop computer, although the use of other suitable portable computers is contemplated. Referring now to FIG. 1a, an Itronix laptop computer is a rugged laptop computer which in at least one form includes the following:

an eight kbps (kilobits per second) wireless packet modem 105c for communicating over a wireless network utilizing an X.25 protocol, a 56 kbps wireline modem 105a for communicating via a wireline network utilizing a PPP protocol, a MICROSOFT WINDOWS operating system 105*g*, a communications layer 105*f* including Broadbeam middleware software for sending and receiving transactions and a modem-controlling application, an instant messaging application 105*d* and a remote system accessing application 105*e*.

Instant messaging application 105*d* in concert with a server-side instant messaging application enables messages to be sent from laptop computer 105 to computer 110 and similarly, enables messages sent from computer 110 to be received on laptop computer 105. Client remote system access application 105*e* is employed to access remote systems 160.

Laptop computer 105 may communicate with system 150 through a physical connection (e.g. data lines such as landline 120). Using a physical connection, laptop computer 105 connects to landline 120 through wireline modem 105*a*. Landline 120 connects in turn to protocol server 135 via data lines 140 and modem pool 130. Once the physical connection between modem 105*a* and protocol server 135 is established, the connection persists until terminated, making modem 105*a* unavailable for use by other applications.

Laptop computer 105 also may contain a wireless modem 105*b* for communicating via a wireless cellular network. In this case, wireless modem 105*b* is a cellular modem. Using cellular modem 105*b*, laptop computer 105 may transmit data through wireless connection 125. Wireless connection 125 enables laptop computer 105 to transmit data to wireless tower 132. Wireless tower 132 transmits data received from laptop computer 105 to protocol server(s) 135 via datalines 140. A wireless cellular connection, once established, is a full-time connection that occupies a port.

Once the cellular connection is established, the connection persists until terminated, making modem 105*b* unavailable for use by other applications.

The digital packet-switched modem may be an eight (8) kbps RIM modem although other wireless digital packet-switched modems such as one manufactured by MOTOROLA may be used. Wireless digital packet-switched modem 105*c* preferably utilizes a Mobitex/X.25 protocol. Preferably, data is transmitted from laptop computer 105 using wireless digital packet-switched modem 105*c*. Wireless connection 125 thus is preferably a digital packet-switched connection.

In particular, in a wireless digital packet-switched wireless transmission, data is assembled into packets containing a header identifying destination, data and a trailer for error checking. The assembled data packets are transmitted in bursts over the wireless network and are reassembled at the destination point. During the periods of time when bursts of data are not being sent, wireless digital packet-switched modem 105*c* may be available to handle other transmissions. Accordingly, use of such modem 105*c* allows multiple applications (such as remote systems access and instant messaging applications) to share such modem 105*c*.

Corn layer 105*f* preferably includes a modem controlling application (not shown), which controls the operation of wireless digital packet-switched modem 105*c*. The modem controlling application controls access to wireless digital packet-switched modem 105*c*. Com layer 105*f* preferably employs BROADBEAM version 3.02 middleware (not shown), a product of. Middleware is software that functions as a conversion or translation layer, providing protocol conversion between network elements, enabling transmission of data, for example, between laptop computer 105 and instant messaging server 117.

Wireless tower 132 transmits data received from laptop computer 105 to one or more protocol servers 135 via data lines 140. Protocol servers 135 in a preferred embodiment are distributed in two separate arrays 135 in two geographically separate data centers (not shown). Each array 135 may contain fifteen (15) individual protocol servers. This server architecture enables a particular laptop computer 105 to connect to a particular protocol server based on user id and state in which the user works. In a preferred embodiment, a request from laptop computer 105 can be served from one of the two data centers, depending on the location and access permission established for the technician sending the request from laptop computer 105.

Protocol servers 135 enable data transmission between laptop computer 105 and servers 115 and 117 and between servers 115 and 117 and laptop computer 105 by providing protocol conversion and middleware services to network 100. Protocol servers 135 enable data transmission, either synchronously or asynchronously, between laptop computer 105 and servers 115 and 117 and between servers 115 and 117 and laptop computer 105. Protocol servers 135 may also provide data compression, encryption, public and private key management, network monitoring and security services.

Protocol servers 135 recognize and handle incoming wireless or landline messages. If data is transmitted via a landline modem, protocol server 135 establishes a physical port connection. If data is transmitted via a wireless modem 105*b* or 105*c* a logical port (for digital packet-switched modem 105*c*) or a physical port (for cellular modem 105*b*) is established. Since laptop computer 105 preferably transmits data to protocol server 135 via wireless digital packet-switched modem 105*c*, protocol server 135 thus establishes a logical port represented by a series of numbers representing a network address. The above architecture allows data to be transferred between all components of network 100, particularly between laptop computer 105 and in-house computers 110.

Protocol servers 135 also typically provide middleware services. Middleware services are provided by middleware (software) resident at protocol server 135 and are used for transmission of data between client and server. The middleware can support multiple types of networks (e.g., RF or land line) and multiple protocols (e.g., TCP/IP, X.25, PPP, UDP, etc.) In a preferred embodiment BROADBEAM version 3.02 is the middleware resident on protocol servers 135.

Protocol servers 135 are in communicative contact with server 115 and instant messaging server 117 and pass user requests and messages to servers 115 and 117. Server 115 may also be known as a transaction request broker and receives, authenticates and services user requests received from laptop computer 105, generates legacy system transactions and sends results back to laptop computer 105. Server 115 also may include a database 120 containing data associated with each technician, including job descriptions, deployment times, job status, etc.

Instant messaging server 117 is in communicative contact with computing device(s) 110 and preferably contains a data store of user ids and the network address associated with each user id. Instant messaging server 117 preferably contains application software that assists in the establishment of a two-way communication between computer 110 and laptop computer 105.

Remote systems 160 is a data store containing legacy system data such as billing information and facility maintenance information.

Computer 110 typically is a desktop workstation but may also be a laptop computer in combination with a docking station or another computing device. In a preferred embodiment in accordance with the present invention, computer 110 is an in-house computer but instant messaging between laptop computer 105 and another field laptop computer (not shown) is within the scope of the invention.

II. Processing

A. Client Side

Mobile personnel, such as technicians, utilize applications on a portable personal computer to gain access to a closed loop proprietary network. After successfully logging into an application such as the remote system accessing application, in one embodiment an icon is present on the laptop computer 105 that enables the laptop computer user to send, receive and respond to messages. In one embodiment of the present invention, the technician can send messages only to a specified group of users.

Figure 2:
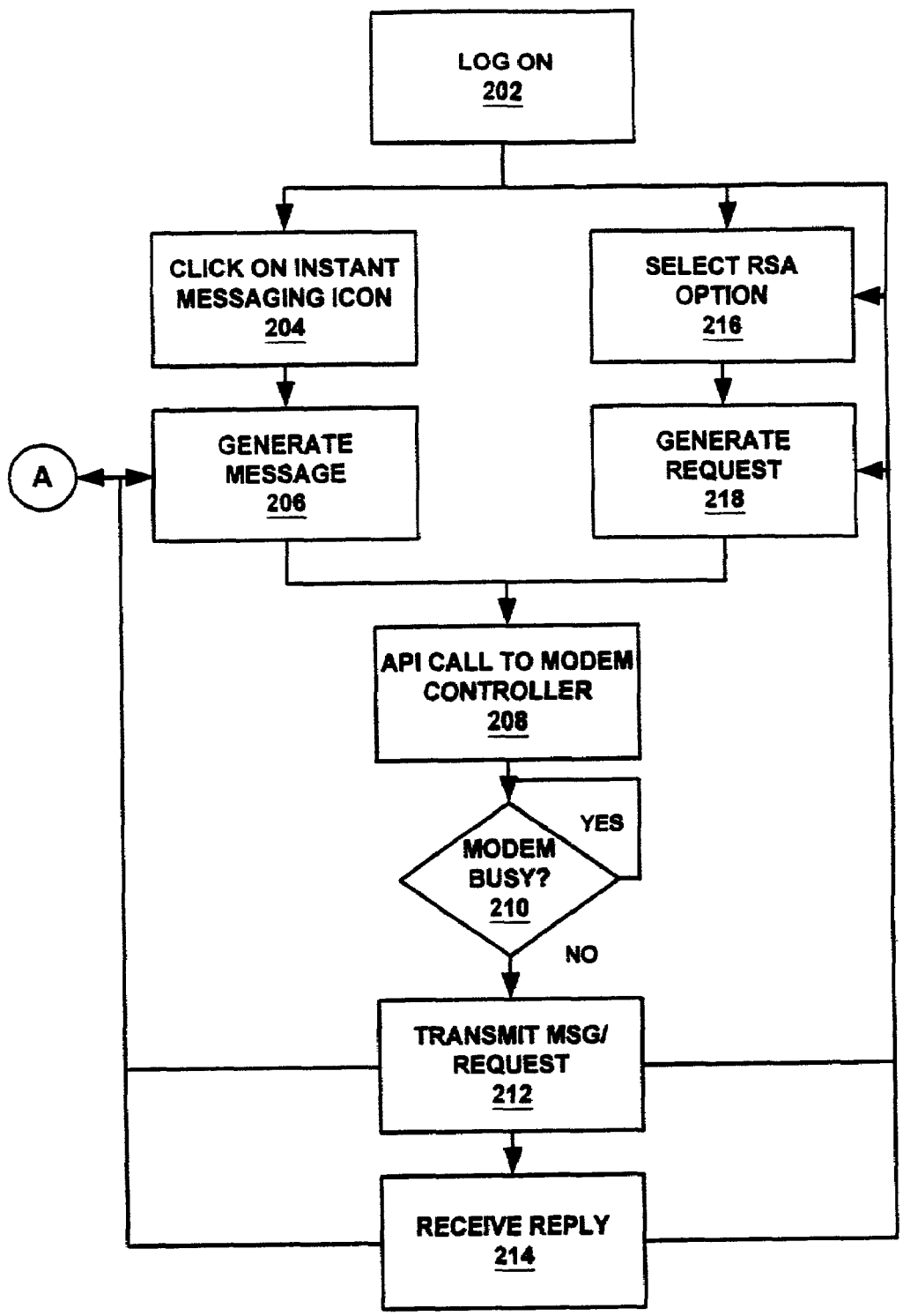
FIG. 2 is a flow diagram of a portion of a method of sending messages while running a network accessing application in accordance with an embodiment of the present invention.

FIG. 2 illustrates a flow diagram of client-side processing in an instant messaging system in accordance with an embodiment of the present invention in which a message is sent from a laptop computer 105. At step 202, a user at laptop computer 105 logs into a first application, which is a remote system access application 105e.

Figure 3:
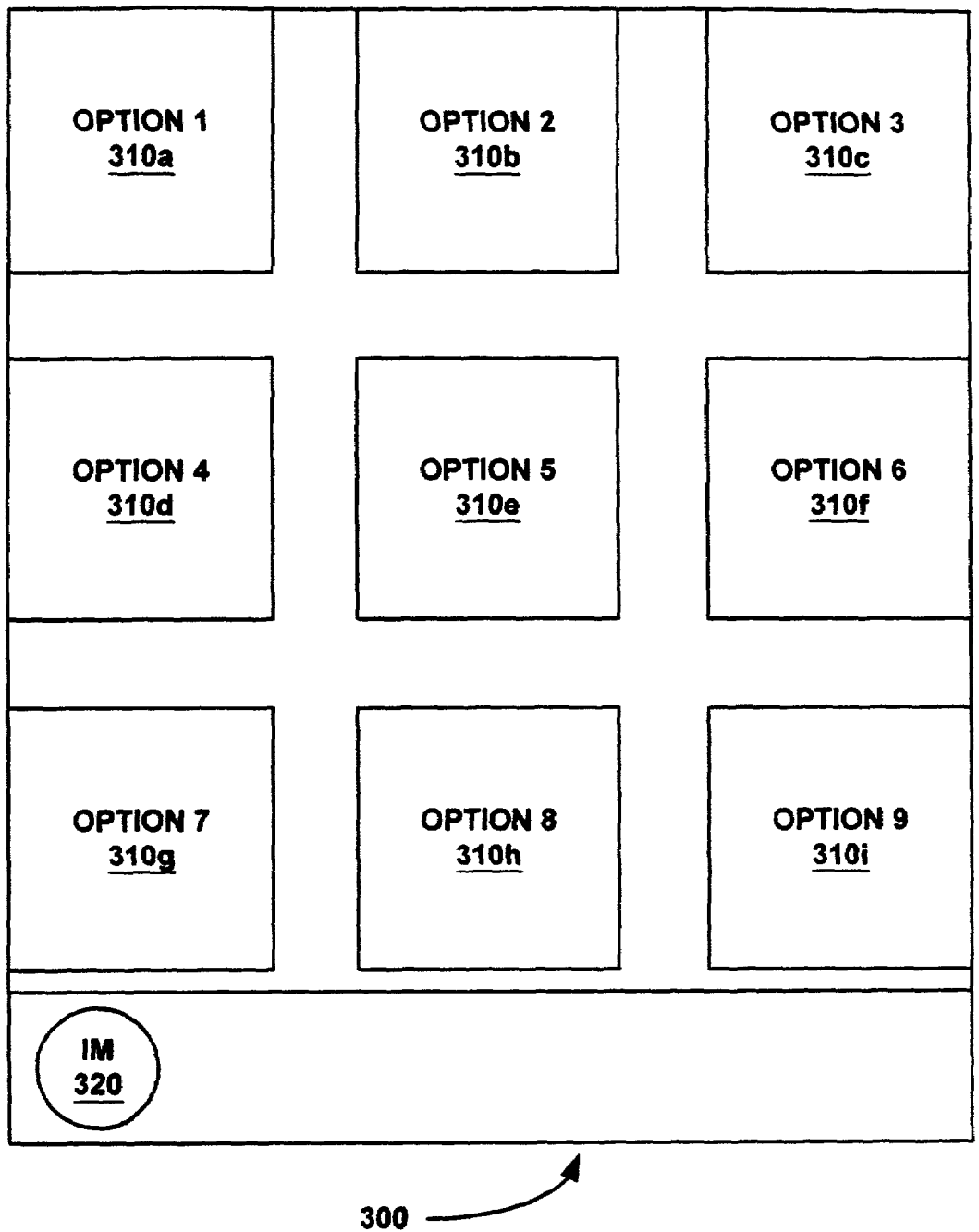
FIG. 3 is a flow diagram of a portion of a method of receiving messages in accordance with an embodiment of the present invention.

At this point, a screen such as the one illustrated in FIG. 3 may be displayed. FIG. 3 illustrates the general options 310 a-i of screen 300 available in remote system access application 105e and an instant messaging icon 320 for accessing the instant message server 117 via an instant messaging application 105d. It should be understood that the screen illustrated in FIG. 3 is exemplary only and the invention is in no way limited to the particular screen or to the specific application (remote system access application) depicted. Similarly, access to instant messaging application 105d by means other than an icon 320 is contemplated by the invention.

At this point, the technician may select one of the options 310 a-i (step 216) or instant messaging icon 320 (step 204).

Instant Messaging Processing

Sending

If the technician clicks on instant messaging icon 320, a message generating screen is displayed that enables the technician to key in a message and a user id representing the message recipient. The message-generating window of instant messaging application 105d may resemble a typical e-mail message drafting/sending screen.

At step 208 client-side instant messaging application 105d makes an API (application program interface) call to modem controlling application software of com layer 105f. An API is a message format used by an application program to communicate with another program and is implemented by writing a function call, which provides the linkage to the required subroutine for execution.

At step 210 modem controlling application software of corn layer 105f determines if modem 105c is busy. If modem 105c is not busy, the message is sent to modem 105c and then transmitted by modem 105c to instant messaging server 117 at step 212. If modem 105c is busy, the message is stored until modem 105c is not busy and then transmitted. At step 214, if a reply is received within a specified period of time, it is displayed on the screen of laptop computer 105c and the technician may return to step 206 to create a response to the reply to send to the same recipient. If no reply is received at step 214 within the time period, or if technician does not create a response to the reply, the technician may create a message to send to a second recipient at step 206. Alternately, the technician may proceed to step 216 to select a remote system access option 310 a-i.

Receiving

Figure 4:
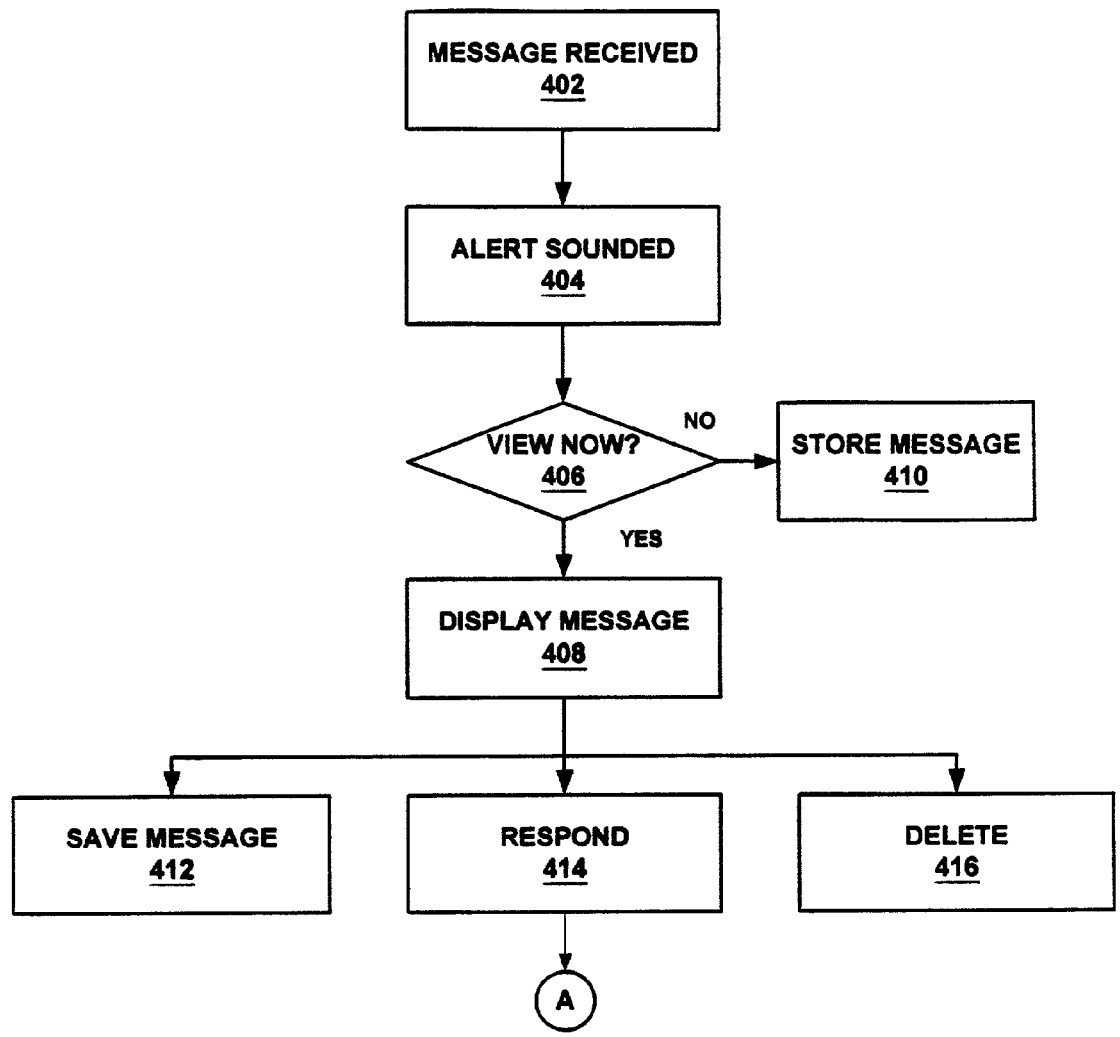
FIG. 4 is an exemplary user interface in accordance with an aspect of the invention.

According to another aspect of the invention, and referring now to FIG. 4, modem 105c of laptop computer 105 may receive a message from instant messaging server 117 at step 402. At step 404 instant messaging application 105d is activated, if the instant messaging application is not already active, and an alert is generated to notify the technician that a message has been received. The alert may be audible and/or visual. At step 406, the technician is asked if the technician wants to view the message now. If the technician answers "yes" a window is opened at step 408 and the message is displayed. If the user answers "no" the message is stored for later viewing at step 410. After viewing the message at step 408, the technician may save the message at step 412, delete the message at step 416 or respond to the message at step 414. If the technician elects to respond to the message, processing continues at step 206 of FIG. 2.

According to one embodiment of the invention, the technician is only able to receive a message from members of a specified group and/or is only able to send a message to members of a specified group. A typical allowable group that a technician may receive a message from or send a message to may include a general manager, a plurality of area managers, a plurality of supervisors and a plurality of dispatchers. In another embodiment a technician may also send messages to and receive messages from other technicians.

RSA (Remote Systems Access)

Returning now to step 202 of FIG. 2, after logon is complete, the technician may select a remote system access option at step 216 and generate a request at step 218. Remote system access application 105e executes an API call to modem controller 105c at step 208. At step 210, modem controller of corn layer 105f determines if modem 105c is busy. If modem 105c is not busy, the message is sent to modem 105c for transmission at step 212. At step 212 the request is transmitted to remote system access server 115. At step 214 a response is received from server 115. At this point processing can continue at step 218, wherein a second request for the same option is entered, at step 216 wherein a second RSA option is selected, or to step 204 where the technician clicks on instant messaging icon 310 or otherwise accesses instant messaging application 105d. Notably, use of digital packet-switched modem 105c allows simultaneous use of such modem by both the RSA application 105e and the instant message system application 105d.

Server-Side

Figure 5:
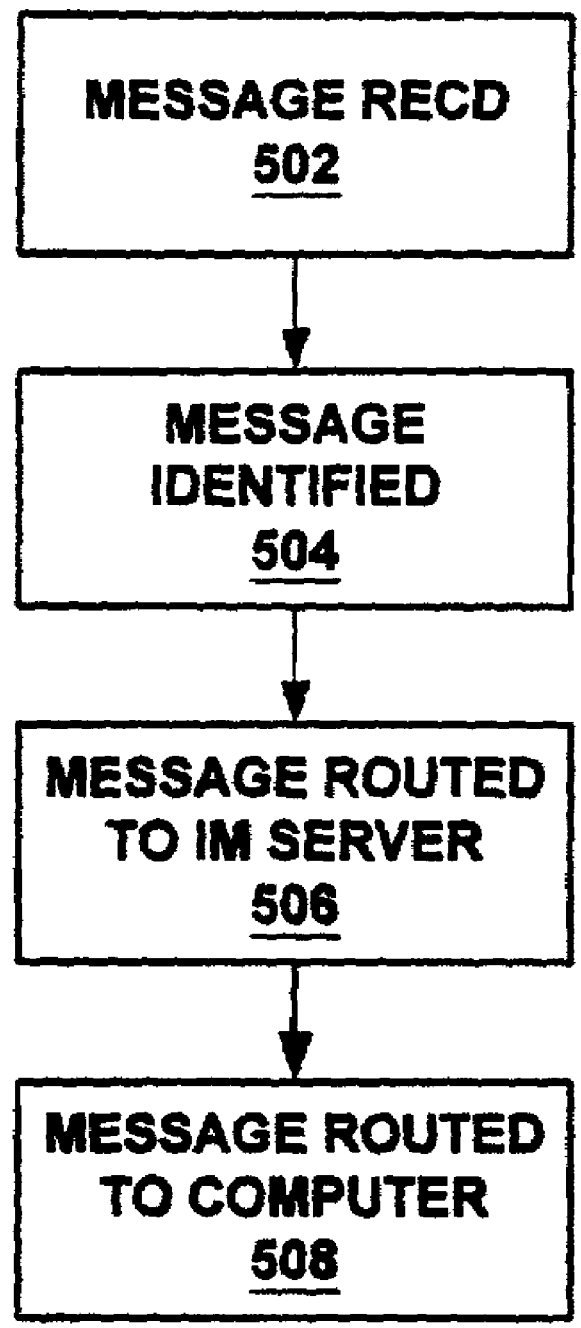
FIG. 5 is a flow diagram of another portion of a method of receiving messages in accordance with an embodiment of the present invention.

FIG. 5 illustrates a flow diagram of a method that takes place on the server-side when transmitting an instant message from a laptop computer to an in-house computer. In step 502 a message is received from modem 105c of laptop computer 105 at protocol servers 135. Protocol servers 135 identify the message as an instant message at step 504. According to one aspect of the invention, at least one server 135 is designated as the instant messaging protocol server and all instant messages are received at the instant messaging protocol server. At step 506, protocol server 135 routes the instant message to instant messaging server 117. Server 117 resolves the user id and sends the message to the indicated computer 110 at step 508.

Figure 6:
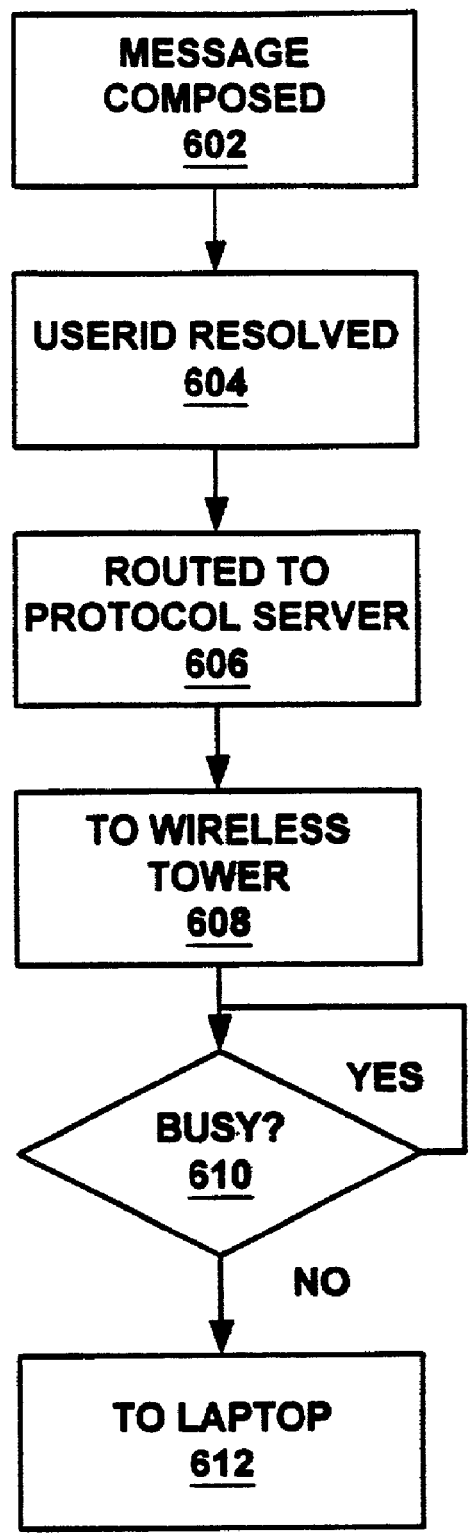
FIG. 6 is a flow diagram of another portion of a method of sending messages in accordance with an embodiment of the present invention.

When transmitting an instant message from computer 110 to laptop computer 105 as illustrated in FIG. 6, a message is composed and addressed to a recipient userid at computer 105 at step 602. In a preferred embodiment, the recipient userid must be a member of a specified group of recipients. At step 604 instant messaging server 117 authenticates the recipient userid of the message, resolves the userid to a unique network address, which may, according to one embodiment of the invention be a modem serial number, and sends the message to protocol servers 135. At step 606 protocol server(s) 135 relay(s) the message to wireless tower 132. At step 608 wireless tower 132 stores the message in a queue and periodically polls the designated wireless digital packet-switched modem 105c (step 610). The message is transmitted to modem 105c when modem 105c is not busy at step 612. At the client, modem 105c sends the message to instant messaging application 105d on client 105. Instant messaging application 105d formats and displays the message on laptop computer 105.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism for enabling an instant messaging function while maintaining contact with remote systems, using a personal computer equipped with a wireless digital packet-switched modem. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method of sending data from a first computing device to at least one of a plurality of second computing devices over a wireless digital packet-switched network, the method comprising:
    initiating a first application on the first computing device including a wireless digital packet-switched modem, the first application accessing and retrieving legacy data from a remote system within a private network, via a protocol server;
    initiating a second application on the first computing device, the second application providing an instant messaging service and enabling instant messaging data to be sent from the first computing device to an instant messaging server within the private network via the protocol server over the wireless digital packet-switched network;
    generating data to be sent from the first computing device to the at least one of the plurality of second computing devices within the private network, wherein data is generatable from the first application as a request to the remote system and generatable from the second application as an instant message, both the data and the instant message being transmitted by way of the wireless digital packet-switched modem;
    initiating a first communication through a communication layer by the first application using a first application program interface (API) call;
    initiating a second communication through the communication layer by the second application using a second API call; and
    transmitting the generated data from the first computing device to the protocol server for delivery of the request to the remote system from the protocol server and for delivery of the instant message from the protocol server to the instant messaging server, wherein the instant message is delivered to the instant messaging server for further delivery to the at least one of the plurality of second computing devices within the private network without transmitting the instant message through the protocol server.

2. The method of claim 1, wherein the first application can access a plurality of remote data systems.

3. The method of claim 1, wherein the instant message is addressed to a user represented by a user identifier.

4. The method of claim 3, wherein the user identifier comprises one of a group of allowed recipients, the method further comprising detecting at the instant messaging server whether the user identifier is of the group of allowed recipients, and delivering the message to the recipient only when the user identifier is of the allowed group.

5. The method of claim 1, further comprising establishing an interactive connection between the first computing device and the second computing device.

6. The method of claim 1, wherein transmitting the generated data from the first computing device to the protocol server for delivery of the request to the legacy system and for delivery of the instant message to the instant messaging server comprises transmitting the generated data including the request to the legacy system and the instant message via an X.25 protocol.

7. A computer-readable medium containing instructions to be executed by a first computing device for performing acts comprising:
    initiating a first application including a wireless digital packet-switched modem, the first application for accessing and retrieving legacy data from a remote system within a private network via a protocol server;
    initiating a second application, the second application providing an instant messaging service and enabling instant messaging data to be sent to an instant messaging server within the private network via the protocol server over a wireless digital packet-switched network;
    generating data to be sent to at least one of a plurality of second computing devices, wherein data is generatable from the first application as a request to the remote system and from the second application as an instant message and is transmitted by way of the wireless digital packet-switched modem;
    initiating a request to a modem controller for access to the wireless digital packet-switched modem; and
    transmitting the generated data to the protocol server for delivery of the request from the protocol server to the remote system and for delivery of the instant message from the protocol server to the instant messaging server, wherein the instant message is delivered to the instant messaging server for delivery to the at least one of the plurality of second computing devices without transmitting the instant message through the protocol server.

8. The computer readable medium of claim 7, wherein the act of transmitting the generated data from the first computing device to the protocol server for delivery of the request to the legacy system and for delivery of the instant message to the instant messaging server comprises transmitting the generated data including the request to the legacy system and the instant message via an X.25 protocol.

9. The computer-readable medium of claim 7, wherein the first application can access a plurality of remote data systems.

10. The computer-readable medium of claim 7, wherein the instant message is addressed to a user represented by a user identifier.

11. The computer-readable medium of claim 10, wherein the user identifier comprises one of a group of allowed recipients, the instructions further comprising detecting at the instant messaging server whether the user identifier is of the group of allowed recipients, and delivering the message to the recipient only when the user identifier is of the allowed group.

12. The computer-readable medium of claim 7, further comprising establishing an interactive connection between the first computing device and the second computing device.

13. A method of sending data from a first computing device to one or more second computing devices over a network, the method comprising:

initiating a first application on the first computing device, the first application accessing and retrieving legacy data from a remote system within a private network, via a protocol server;

initiating a second application on the first computing device, the second application providing an instant messaging service and enabling instant messaging data to be sent from the first computing device to an instant messaging server within the private network via the protocol server;

generating data to be sent from the first computing device to the one or more second computing devices within the private network, wherein data is generated from the first application as a request to the remote system and generated from the second application as an instant message; and transmitting the generated data to the protocol server for delivery of the request to the remote system from the protocol server and for delivery of the instant message from the protocol server to the instant messaging server, wherein the instant message is delivered to the instant messaging server for further delivery to the at least one of the plurality of second computing devices within the private network without transmitting the instant message through the protocol server.

14. The method of claim 13, wherein the first application can access a plurality of remote data systems.

15. The method of claim 13, wherein the instant message is addressed to a user represented by a user identifier.

16. The method of claim 13, wherein the user identifier comprises one of a group of allowed recipients, the method further comprising detecting at the instant messaging server whether the user identifier is of the group of allowed recipients, and delivering the message to the recipient only when the user identifier is of the allowed group.

17. The method of claim 13, further comprising establishing an interactive connection between the first computing device and the second computing device.

18. The method of claim 13, wherein transmitting the generated data from the first computing device to the protocol server for delivery of the request to the legacy system and for delivery of the instant message to the instant messaging server comprises transmitting the generated data including the request to the legacy system and the instant message via an X.25 protocol.

\* \* \* \* \*